United States Patent [19]
Jehle et al.

[11] Patent Number: 4,695,842
[45] Date of Patent: Sep. 22, 1987

[54] AIRCRAFT RADAR ARRANGEMENT

[75] Inventors: Franz Jehle; Holger Meinel, both of Ulm, Fed. Rep. of Germany

[73] Assignee: Licentia Patent-Verwaltungs-GmbH, Frankfurt am Main, Fed. Rep. of Germany

[21] Appl. No.: 748,303

[22] PCT Filed: Oct. 16, 1984

[86] PCT No.: PCT/EP84/00319
§ 371 Date: Jul. 30, 1985
§ 102(e) Date: Jul. 30, 1985

[87] PCT Pub. No.: WO85/01799
PCT Pub. Date: Apr. 25, 1985

[30] Foreign Application Priority Data
Oct. 17, 1983 [DE] Fed. Rep. of Germany ....... 3337649

[51] Int. Cl.$^4$ .............................................. G01S 13/87
[52] U.S. Cl. ..................... 342/59; 342/175; 342/188; 342/129
[58] Field of Search ..................... 343/17.1 R, 17.2 R; 342/59, 129–130, 175, 160, 27

[56] References Cited

U.S. PATENT DOCUMENTS

| | | | |
|---|---|---|---|
| 3,772,689 | 11/1973 | Root, Jr. | 343/17.2 R |
| 4,041,489 | 8/1977 | Lewis | 343/17.1 R |
| 4,110,754 | 8/1978 | Endo | 343/17.2 R |
| 4,118,703 | 10/1978 | Williams | 343/17.2 R |
| 4,538,148 | 8/1985 | Petitjean | 343/17.2 R |

Primary Examiner—T. H. Tubbesing
Assistant Examiner—Mark Hellner
Attorney, Agent, or Firm—Spencer & Frank

[57] ABSTRACT

For an aircraft radar arrangement, particularly helicopters, a first frequency is provided at a maximum of atmospheric attenuation and a second frequency near the first frequency in a region of less atmospheric attenuation, preferably at 60 GHz and 50 GHz. The first frequency serves to provide obstacle warnings, the second to provide for moving target detection and navigation. The mm wave components of the arrangement can substantially be used for both frequencies so that significant savings in weight, space and costs result.

14 Claims, 2 Drawing Figures

AIRCRAFT RADAR ARRANGEMENT

BACKGROUND OF THE INVENTION

The invention relates to a radar arrangement including a transmit/receive antenna which can be alternately connected, by way of a transmit/receive switch to transmitting and receiving devices.

Aircraft radar arrangements are generally subject to restrictions regarding weight and space requirement. While in conventional radars, the fixed target echoes are suppressed by MTI [moving target indication] or similar measures, for low-flying aircraft it is necessary to be able to detect, in addition to moving targets, obstacles, such as trees, poles or high tension wires, so as to avoid collisions with such obstacles.

SUMMARY OF THE INVENTION

It is an object of the present invention to provide a radar arrangement of the type described above which meets the above-mentioned requirements.

The above and other objects are accomplished in the context of an aircraft arrangement of the type first described above which includes the provision of a transmitting means comprising first and second transmitting devices for generating transmitting signals at a first frequency ($f_1$) and at a second frequency ($f_2$), respectively, with the first frequency ($f_1$) lying in a region of maximum atmospheric attenuation and being used for obstacle warning and the second frequency ($f_2$) lying in the vicinity of the first frequency ($f_1$) and in a region of low atmospheric attenuation and being used for moving target detection, the first and second transmitting devices being jointly connected with the antenna by the transmit/receive switch, and the provision of a receiving means including first and second frequency selective devices jointly connected to the antenna by the transmit/receive switch and first and second receiving channels connected to the first and second frequency selective devices, respectively, the first frequency selective device passing first received signals corresponding to echoes of the first transmitted signal of frequency ($f_1$) to the first receiving channel to be processed for obstacle warning and the second frequency selective device passing second receive signals corresponding to echoes of the second transmitted signal of frequency ($f_2$) to the second receiving channel to be processed, independently and separately of the first receive signals, for moving target detection.

The invention makes it possible, when operated at the first frequency, to give a warning about obstacles and, when operated at the second frequency, to use one and the same device for the detection of moving targets and navigation. This arrangement results in a considerable reduction of expenses, as well as weight and space requirements. Due to the fact that both frequencies lie closely adjacent one another, the same waveguides, antenna and other components can be used for both frequencies. The detection of moving targets and navigation requires the use of radiation which can be transmitted over a long range so that the frequency provided for this purpose is placed into a region which has low atmospheric attenuation. For a warning about obstacles, however, the maneuvering volume must be covered within a certain reaction time, i.e. as a function of velocity, which does not require such long ranges. To avoid unnecessary interference in other HF systems, there should be as little radiation as possible beyond the monitoring volume of the obstacle warning radar so that high atmospheric attenuation is an advantage for this operating mode.

The invention meets both requirements in an advantageous manner in that obstacle warning is performed by means of a first frequency which has been placed at a maximum of atmospheric attenuation and detection of moving targets and navigation are effected by means of a second frequency placed to one side of this maximum. The second frequency is most favorably placed below the first frequency at the steeper and more deeply descending low-frequency side of the attenuation maximum.

In the receiving branch of the arrangement, the echo signals belonging to different transmitted frequencies are separated by frequency selective means and are fed to one of two receiving channels, either for the detection of obstacles or for the evaluation of moving targets and navigation.

The invention finds particularly advantageous use in helicopters which, due to their low flying altitude, are especially endangered by obstacles. Obstacle warning and moving target detection can here be performed in continuous alternation. Another advantageous mode of operation provides that obstacle warning and moving target detection are performed essentially at different points in time and with the consideration that most often the helicopter is to monitor a given area for moving targets without itself performing extensive flying maneuvers but that, on the other hand, when it is flying toward this area, only the obstacle warning mode is necessary.

BRIEF DESCRIPTION OF THE DRAWINGS

The invention will be illustrated below with the aid of a preferred embodiment and with reference to the drawings, wherein.

DESCRIPTION OF THE PREFERRED EMBODIMENT

Figure 1:
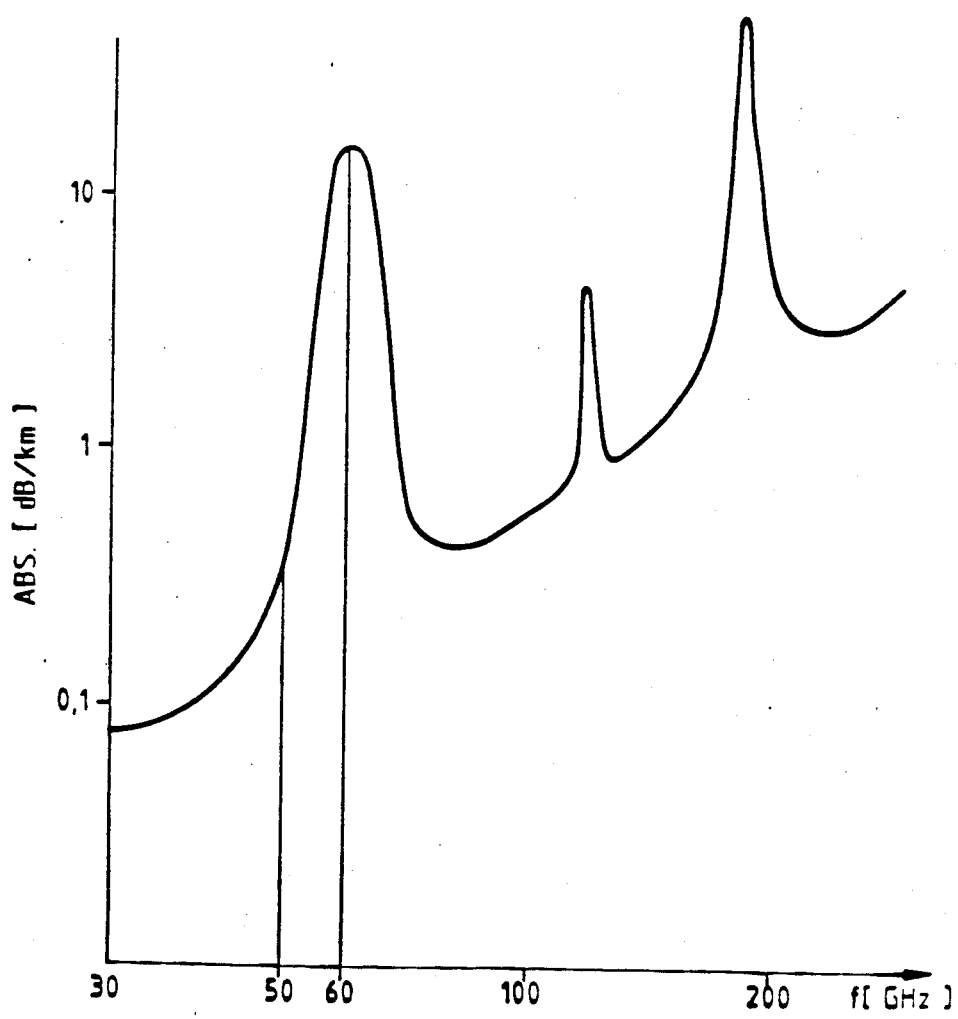
FIG. 1 is the basic frequency curve of atmospheric attenuation and the preferred frequency positions.

FIG. 1 shows a curve for the absorption of millimeter waves in the atmosphere which results in a position for the first frequency $f_1$ at a maximum of 60 GHz and a position of the second frequency $f_2$ at 50 GHz. In spite of the small distance between frequencies, the absorption values show a difference of more than 15 dB/km.

Figure 2:
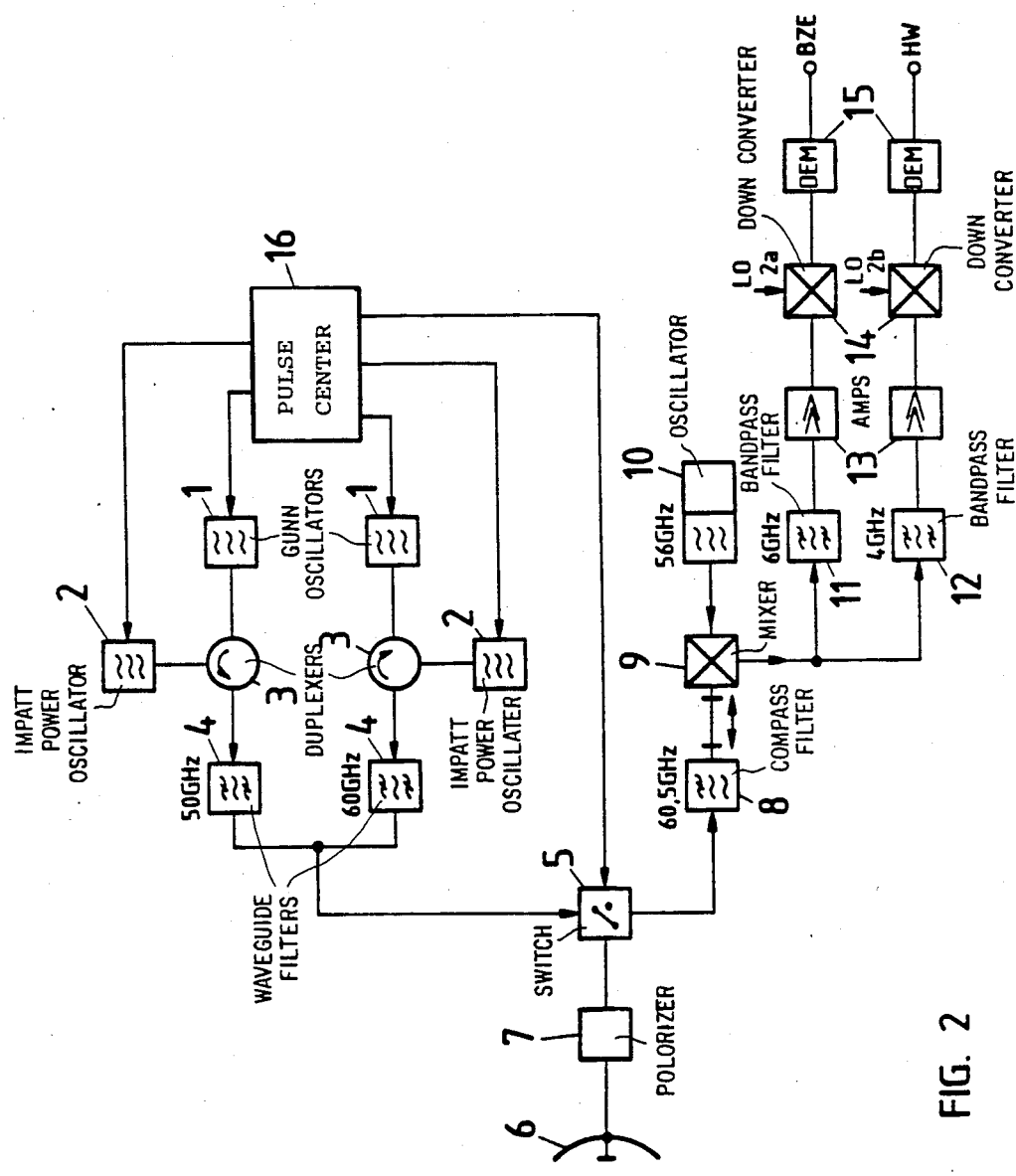
FIG. 2 is a block circuit diagram of an advantageous arrangement according to the invention.

In the arrangement shown in FIG. 2, it is of advantage to provide only the mm wave components of the transmitting train twice.

A pulsed Gunn oscillator 1 is provided for 50 GHz and for 60 GHz, respectively, and synchronizes a corresponding IMPATT [impact avalanche and travel time] power oscillator 2. The output power is fed to transmit/receive switch 5 by way of a duplexer 3 constructed of waveguide filters 4 and to antenna 6 by way of transmit/receive switch 5.

The polarizer 7 inserted between antenna 6 and transmit/receive switch 5 is designed for a transmitting frequency of 50 GHz and at this frequency produces a delay of $\frac{3}{4}\lambda$. At 50 GHz it thus passes only the component of the ehco signal which is circularly parallel to the transmitted signal. Since the echoes from natural targets are based, inter alia, on simple reflection, such natural targets are cut out at 50 GHz while targets, such as, for example, land vehicles, exhibit multiple reflection of the radar signal in the corners and the echoes pass through the polarizer. Since the three-quarter wavelength at 50 GHz corresponds approximately to a whole wavelength at 60 GHz, the influence of the polarizer on the first frequency is negligible so that the detection of obstacles is not impeded thereby.

The oscillators and the switch are controlled by a pulse center.

The receiving branch is composed of a balanced mixer 9 with a lowpass filter 8 having a limit frequency $f_G = 60.5$ connected upstream and a passively stabilized mixer oscillator 10 having an oscillator frequency $f_0 = 56$ GHz. This structure makes it possible to reduce conversion losses at 50 GHz by image frequency reconversion.

The 50 GHz signal for moving target detection is converted to an intermediate frequency $f_3 = 6$ GHz and the 60 GHz signal for obstacle warnings is converted to an intermediate frequency $f_4 = 4$ GHz.

Bandpass filters 11 and 12 direct the frequency converted signal to a respective one of two receiving channels equipped with devices 13, 14, 15 for amplification, further down conversion, demodulation and evaluation.

We claim:

1. In an aircraft radar arrangement comprising transmitting means and receiving means, a transmit/receive antenna, and a transmit/receive switch for alternatingly connecting the antenna to the transmitting means and receiving means the improvement wherein:

said transmitting means comprises first and second transmitting devices for generating transmitting signals at a first frequency and at a second frequency ($f_2$), respectively, with the first frequency ($f_1$) lying in a region of maximum atmospheric attenuation and being used for obstacle warning and the second frequency ($f_2$) lying in the vicinity of the first frequency and in a region of low atmospheric attenuation and being used for moving target detection, and said first and second transmitting devices being jointly connected with said antenna by said transmit/receive switch; and said receiving means includes first and second frequency selective devices jointly connected to said antenna by said transmit/receive switch, and first and second receiving channels connected to said first and second frequency selective devices, respectively, said first frequency selective device passing first received signals corresponding to echoes of the first transmitted signal of frequency ($f_1$) to said first receiving channel to be processed for obstacle warning, and said second frequency selective device passing second received signals corresponding to echoes of the second transmitted signal of frequency ($f_2$) to said second receiving channel to be processed, independently and separately of said first received signals, for moving target detection.

2. Arrangement according to claim 1, wherein the first frequency ($f_1$) lies at the maximum of atmospheric attenuation at 60 GHz and the second frequency ($f_2$) lies at approximately 50 GHz.

3. Arrangement according to claim 1, wherein said receiving means contains a mixer oscillator for producing a mixing signal having a third frequency ($f_0$) and a broadband mixer connected for receiving echoes of the transmitted signals of the first and second frequencies ($f_1$, $f_2$) and for receiving the mixing signal, with the frequency ($f_0$) of the mixing signal of said mixer oscillator being placed so that, depending on the transmitted signal frequency, different intermediate frequencies ($f_3$, $f_4$) are produced at the output of said broadband mixer; and said frequency selective devices are arranged downstream of said broadband mixer.

4. Arrangement according to claim 3, wherein said broadband mixer is a balanced mixer, and said receiving means further includes a filter connected upstream of said broadband mixer for image frequency reconversion at the second transmitting frequency ($f_2$).

5. Arrangement according to claim 3, wherein said broadband mixer is designed in the fin conductor technology.

6. Arrangement according to claim 1, and further including a circular polarizer connected between said antenna and said transmit/receive switch, said circular polarizer being dimensioned for the second transmitting frequency ($f_2$).

7. Arrangement according to claim 2, and further including a $\frac{3}{4}\lambda$ circular polarizer which is dimensional for the second transmitting frequency ($f_2$) and which is disposed between said antenna and said transmit/receive switch.

8. Arrangement according to claim 1, characterized in that the transmit/receive switch is a broadband circulator.

9. Arrangement according to claim 1, characterized in that the transmit/receive switch is a filter diplexer.

10. Arrangement according to claim 1, characterized in that the transmit/receive switch (5) is a PIN diode switch.

11. Arrangement according to claim 10, characterized in that, in the receive phase, the PIN diode switch (5) includes the time-dependent attenuation (STC) of the radar receiver.

12. Arrangement according to claim 1, characterized by its use in a helicopter.

13. Arrangement according to claim 2, wherein said receiving means contains a mixer oscillator for producing a mixing signal having a third frequency ($f_0$) and a broadband mixer connected for receiving echoes of the transmitted signals of the first and second frequencies ($f_1$, $f_2$) and for receiving the mixing signal, with the frequency ($f_0$) of the mixing signal of said mixer oscillator being placed so that, depending on the transmitted signal frequency, different intermediate frequencies ($f_3$, $f_4$) are produced at the output of said broadband mixer; and said frequency selective devices are arranged downstream of said broadband mixer.

14. Arrangement according to claim 4, wherein said broadband mixer is designed in the fin conductor technology.

* * * * *